United States Patent [19]

Faudarole

[11] 4,191,165
[45] Mar. 4, 1980

[54] BREAKSUN SHIELD OPERATING AS A COLLECTOR

[75] Inventor: Ernesto Faudarole, Turin, Italy

[73] Assignee: Stars Stampaggio Resine Speciali S.p.A., Turin, Italy

[21] Appl. No.: 856,224

[22] Filed: Dec. 1, 1977

[30] Foreign Application Priority Data

Dec. 3, 1976 [IT] Italy ................................ 69892 A/76

[51] Int. Cl.² ............................................... F24J 3/02
[52] U.S. Cl. ..................................... 126/445; 126/428; 165/53; 126/450
[58] Field of Search ............... 126/270, 271; 237/1 A; 165/53, 47

[56] References Cited

U.S. PATENT DOCUMENTS

| | | | |
|---|---|---|---|
| 1,841,557 | 1/1932 | Storms | 165/165 X |
| 2,857,634 | 10/1958 | Garbade et al. | 126/270 |
| 3,048,375 | 8/1962 | Walker | 126/270 |
| 3,974,822 | 8/1976 | Patil | 126/271 |
| 3,981,445 | 9/1976 | Custer | 165/53 |
| 4,054,125 | 10/1977 | Eckels | 126/270 |

Primary Examiner—James C. Yeung
Assistant Examiner—Larry Jones
Attorney, Agent, or Firm—Scully, Scott, Murphy & Presser

[57] ABSTRACT

A sun shield for installation on the outside of building facades comprising a plurality of orientable adjacent pallets. The pallets are adapted to act as sun shields and also as collectors of solar energy. Each pallet has at least one transparent surface and an inner collector which is irradiated through the transparent surface and within which an intermediate fluid is circulated to be warmed by solar radiation incident on the pallet.

14 Claims, 7 Drawing Figures

4,191,165

BREAKSUN SHIELD OPERATING AS A COLLECTOR

FIELD OF THE INVENTION

The present invention relates to sun shields comprising a plurality of orientable adjacent slats for installation on the outside of building facades to intercept sunbeams in order to keep such facades shaded without the need for curtains, blinds or other partial shields applied to the window opening.

BACKGROUND TO THE INVENTION

At present, known sun shields of this type are formed by a plurality of vertical elongate shielding members or slats having a lenticular outline section, commonly termed "pallets", made of a bent metallic sheet or an aluminium alloy extruded section. Such pallets have a hollow interior and their external surfaces are treated with paints or other surface treatments suitable to reflect sunbeams.

SUMMARY OF THE INVENTION

The present invention is based on the appreciation that such sun shields present a large external surface area which is exposed to solar radiation so that instead of being used merely as reflecting shields they can be used as conventional shields and at the same time function as members for accumulating solar energy. Therefore, most generally, the present invention provides a shield for locating on the outside of building facades, having the double function of a sun shield and of a solar energy collector, particularly of the type where an intermediate fluid, circulating in a closed circuit, which includes a heat exchanger, is heated by solar energy.

Within the scope of this inventive conception, the invention provides a sun shield having orientable pallets wherein each pallet includes at least one transparent surface for exposure to sunbeams and at least one inner collector which is irradiated, in use, through said transparent surface, and within which collector the intermediate fluid circulates.

The pallets are preferably made of a polymeric material and include an external shell, formed by extrusion with a lenticular profile and having at least one transparent wall, an inner collector providing vertically extending cells, at least the surface of which is adapted to act substantially as a black body, and two collecting heads for the delivery and the recycling of said fluid, which heads are connected to and cooperate with upper and lower end portions of said external shell, respectively.

In a preferred embodiment of the invention, one wall of said external shell and the inner collector are formed integrally, conveniently by extrusion, and the other wall of the shell, preferably said transparent wall, is inserted and firmly located on said one wall by interengaging means on such walls. It is also possible to provide a double transparent wall, that is a wall formed by two sheets located face to face delimiting a hollow air space therebetween in order to improve the "greenhouse" effect, referred to in the description.

The aforesaid heads may each carry an integrally formed trunnion for the pallets whereby the pallets may be angularly displaced about the vertical axis of said trunnions. The trunnions may be hollow and received in seats in corresponding support structures housing pipes for passing the intermediate fluid. In order to strengthen the structure, the trunnion cavity may be lined with a metallic tube, preferably made of an aluminium alloy, which extends longitudinally through the entire length of the pallet, along its axis of rotation.

A plurality of orientable pallets according to the invention may be installed to shield the facade of a building, the ends of each pallet being pivotally seated in the support structures housing the intermediate fluid pipes. Fluid passed along the vertically extending cells of the pallet solar collectors, is warmed by irradiation and is passed to a heat exchanger which transfers the heat to an operating fluid. From the exchanger, the intermediate fluid is recycled by pumps. Groups of the pallets may be connected in series for the passage of the intermediate fluid successively the pallets in each group, such groups being connected in parallel. The number of pallets forming each group is pre-established in relation to the pallet axial extension or more particularly in relation to the whole irradiated surface area and the pre-established final temperature for the intermediate fluid.

The orientation of the pallets is, in use, effected in order to intercept the greatest amount of incident solar radiation and may be effected by a manual or mechanical control and, in the latter case, preferably controlled by a timing device.

BRIEF DESCRIPTION OF THE DRAWINGS

An embodiment of the invention will now be described by way of example only and with reference to the accompanying drawings, in which.

DETAILED DESCRIPTION

Figure 1:
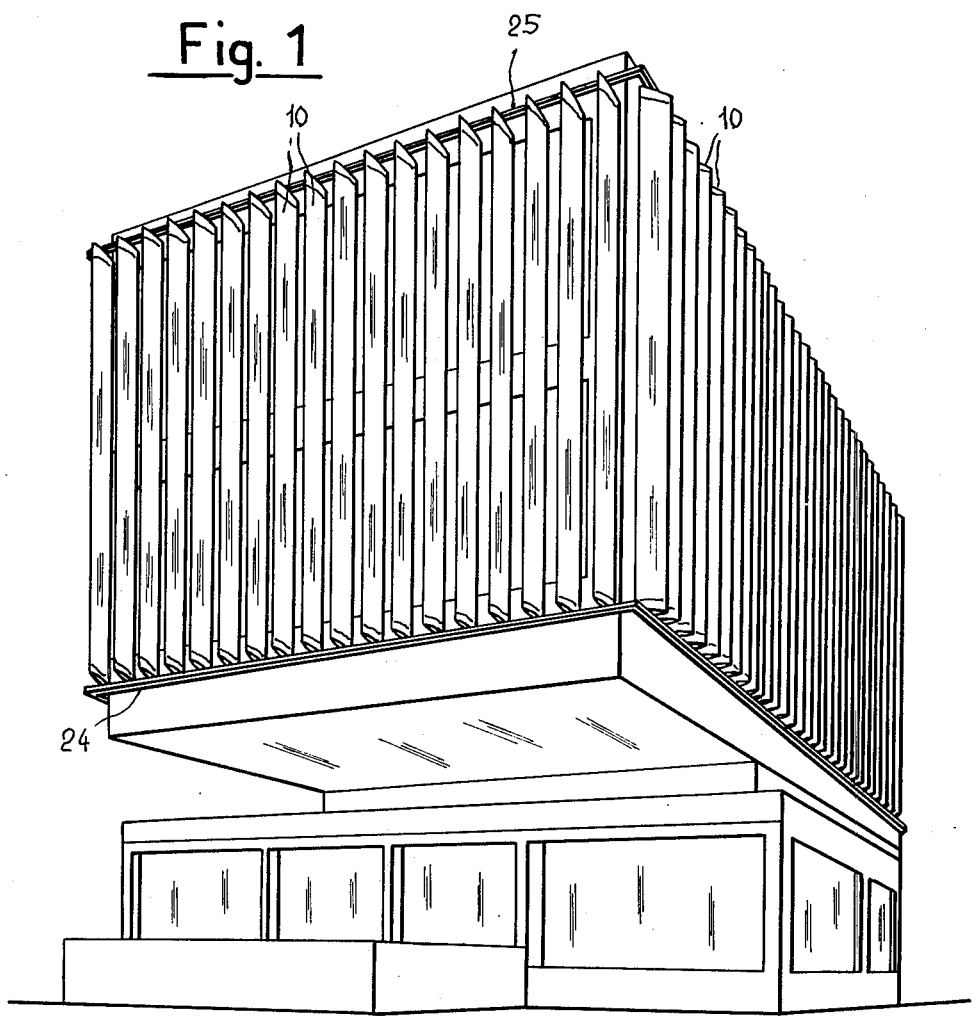
FIG. 1 is a perspective view of a building having facades shielded by a sun shield embodying the invention.

With reference to FIGS. 1 to 6, numeral 10 indicates generally a pallet of a sun shield according to the invention. It is essentially formed by an external shell having a lenticular section with a front wall 11 and a rear wall 12, a solar energy collector 13 contained in the shell and two heads 14, 15 which close the upper and lower ends of the shell. All these components are preferably made of a polymeric material; the walls 11, 12 and the collector 13 are formed by continuous drawing, and the heads are manufactured by known compression molding techniques.

Although it is advantageous to use a polymeric material, the pallets of a sun shield according to the invention may may alternatively be made of other material, e.g. metallic materials, particularly in aluminum or alloys thereof, or other metals or metal alloy and are preferably extruded.

Figure 3:
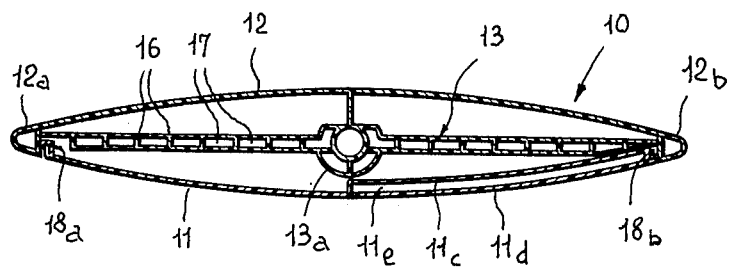
FIG. 3 is a transverse section along line III—III of FIG. 2.
Figure 2:
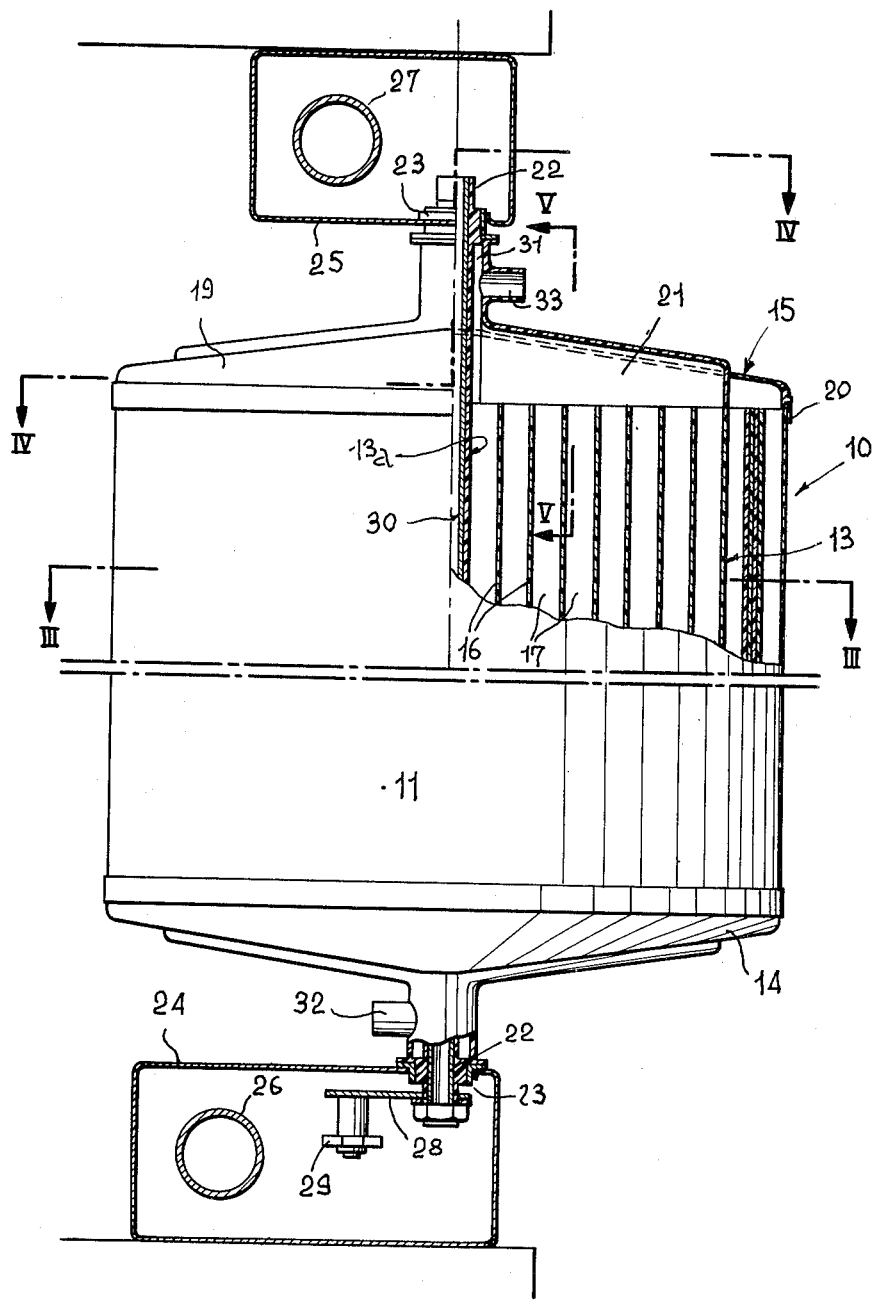
FIG. 2 is an elevation, partly in section, of the sun shield of FIG. 1 which is pivotally connected to supports housing piping for a fluid circulated through the sun shield pallets.
Figure 4:
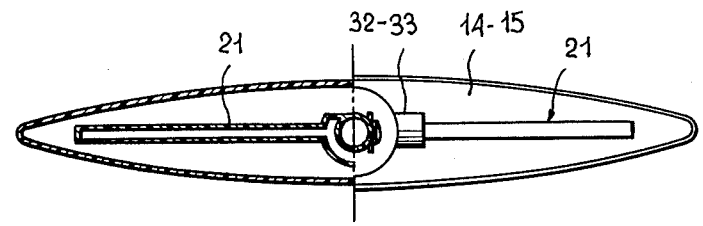
FIG. 4 is a transverse section along line IV—IV of FIG. 2.

As clearly shown in FIG. 3, the rear wall 12 and the collector 13 are integrally formed. The collector 13 comprises generally a double walled plate within the thickness of which a plurality of separation baffles or portions 16 are provided to define a series of juxtaposed cells 17 extending longitudinally of the pallet. In use the longitudinal axis of the pallet extends in a generally vertical direction so that such cells similarly extend generally in a vertical direction. The collector 13 is connected to wall 12 at its edges 12a, 12b, which, in order to strengthen the structure, have a tubular profile and each carry an "L" shaped flange 18a, 18b respectively, with which corresponding longitudinal seating flanges 11a, 11b of the inserted front wall 11 are resiliently engageable in order to hold such front wall in position. The front wall is made of a transparent polymeric material in order to allow sunbeams to reach the collector 13 to which they transmit their calorific energy. For a greater thermal efficiency the collector is adapted to act substantially as a "black body" with non polished inner and external surfaces so as to minimize reflection of such radiation and consequent heat dispersion. Further, for the same object of increasing thermal efficiency, the transparent front wall 11 may be a double wall, formed by a pair of wall sheets 11c, 11d located face to face and delimiting a hollow space 11e thereby to increase the so-called "greenhouse effect", namely the reduction of thermal conductivity and hence heat dispersion from the inside to the outside of the pallet.

Each head 14-15 is formed as a cover and comprises a bell-shaped member 19 having a profile identical to the lenticular profile of the pallet shell, and having an enlarged rim 20 around the mouth of the bell-shaped member 19 which rim fits over an adjacent end portion of the shell. As clearly shown in FIGS. 2 and 5, the rim 20 is provided by an L shaped flange extending around the mouth of the member 19 and engages with the possible interposition of a gasket 20a of a resiliently yieldable material, around the adjacent end of the shell to which it is intimately connected, e.g. by an adhesive or welding or the like to effect a tight closure. Each member 19 contains a collector portion 21 which, when the plate is placed onto the external shell, forms an extension of collector 13. The portion 21 is substantially funnel-shaped and terminates at a hollow pin 22. The pins 22 of each pallet 10 are engaged with the interposition of bushes 23, preferably made of metal to lower and upper supports 24 and 25 formed by box-like continuous structures housing respectively a recycle collecting pipe 26 and a delivery pipe 27 for the intermediate fluid which is to be warmed during its passage through the vertical cells 17 of the solar collector 13. The engagement of the pins 22 of each pallet and the bushes 23 is such as to allow the angular pivoting of the pallet around the aligned vertical axes of the pines to permit orientation of the pallet. This orientation is effected by means of any known mechanism, e.g. a mechanism including a driving handle 28 connected to one end of the lower pin 22 and angularly displacable by a connecting rod 29 which may be operated by a manual control or, preferably, by a timed control mechanism.

In order to improve the mechanical strength of the pallet, which has a considerable longitudinal extent, it is advantageous for the cavity within pins 22 to be lined with a metallic tube 30 extending from one pin to the other through the collector 13, the pallet having a central cylindrical seat 13a for such tube. The collector portions 21 of each head communicate, through an annular hollow space 32 beneath the pins 22, with a respective pipe union 32, 33 which are connected by hoses 34, 35 to the respective fluid recycling and delivery pipes 26, 27.

Figure 7:
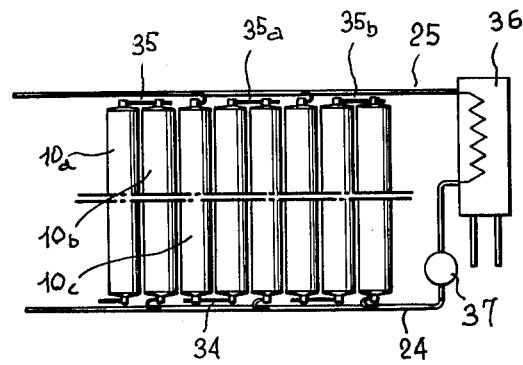
FIG. 7 is a schematic elevation showing a plurality of pallets and their interconnection in a heating installation.
Figure 5:
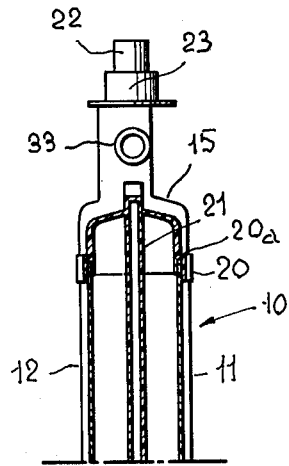
FIG. 5 is a part longitudinal section along line V—V of FIG. 2.
Figure 6:
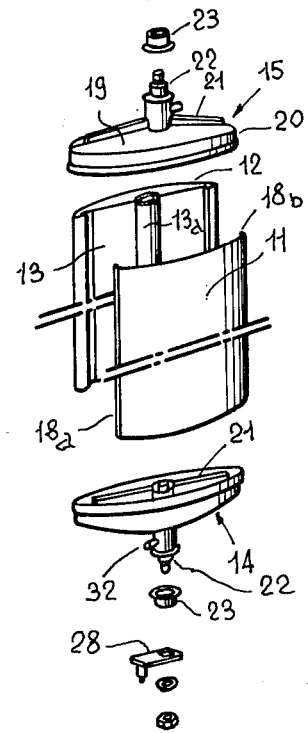
FIG. 6 is an exploded perspective view of a sun shield pallet.

As shown in FIG. 1 and the diagram of FIG. 7 a plurality of pallets $10a$, $10b$, . . . $10_n$, according to the present invention, are installed to shield the facade of a building, and can be pivoted, as described above, on supports 24 and 25 previously installed at the respective lower and upper edges of the facade. An intermediate fluid, e.g. water suitably treated and desalted, is fed through the recycle pipe 26 to the pallet collectors 13. Therein, the fluid is heated by solar irradiation and, the heated fluid passes through the delivery pipe 27 to a heat exchanger 36 in which it gives its calorific energy to an operating fluid. e.g. the water of a heating system or the water for the feeding of boilers producing vapor or the like. From the heat exchanger 36, the fluid is recycled by one or more pumps 37. The intermediate fluid is preferably passed through groups of pallet connected in series, which groups are connected in parallel with one another. FIG. 7 shows as an example each group formed by three pallets which are connected in series through pipings 35, 35a, 35b and each group connected in parallel to the collecting pipings 26, 27. The number of pallets forming each group may however vary in relation to the whole irradiated surface area of the pallets and the final temperature pre-established for the intermediate fluid.

A number of tests have shown that the thermal efficiency of collectors 13, as the power, is variable between 500 and 550 $W/w^2$ for an annual medial irradiation within a latitude band comprising the center/southern Europe.

It will be appreciated that an important advantage of the above described system is that, due to the nature of the pallet component elements, these may be obtained by extrusion and then cut to the required lengths, according to the various installation requirements.

Modifications of the above described embodiments are possible without departing from the scope of the invention.

We claim:

1. In a sun shield for building external facades and of the type comprising a plurality of orientable pallets, an improved pallet having the double function of a sun shield and a collector of solar energy, is made of polymeric material and includes an external shell having a lenticular cross-section and formed by extrusion, at least one transparent wall, an inner collector which is divided internally into separate cells extending longitudinally of the pallet and at least the surfaces of which are adapted to act substantially as a black body and two collecting heads for the delivery and recycling of an intermediate fluid to be heated by solar energy incident on the pallet, said collecting heads being sealingly connected to the upper and lower ends of said external shell.

2. A sun shield according to claim 1, wherein the external shell is formed by two walls connected to each other, one of said walls and the inner collector being formed integrally, and the other wall, preferably the transparent wall, being firmly located on said one wall to complete the shell.

3. A sun shield, according to claim 2, wherein the collector is connected to said one wall along opposite edges thereof, which edges extend longitudinally of the pallet, have a tubular profile, and each carry an "L"-shaped flange extending along the respective edge, which flange is engaged by a corresponding longitudinal seating flange on said other wall whereby to locate such other wall on said one wall.

4. A sun shield, according to claim 1, wherein the inner collector comprises a hollow plate within which separate cells are defined by a plurality of partitions, the cells extending longitudinally of the pallet.

5. A sun shield according to claim 1, wherein the transparent wall is formed by a single sheet of a polymeric material.

6. A sun shield according to claim 1, wherein the transparent wall is formed by a pair of sheets located face to face and spaced apart to define an air gap therebetween.

7. A sun shield according to claim 1, wherein each head comprises a bell-shaped member with an annular rim around the mouth of such member which rim receives and is firmly connected to a respective end portion of the shell, the rim being provided by an L section flange extending around and projecting from the mouth of said member.

8. A sun shield according to claim 7, wherein the gasket of a resiliently yieldable material is located between said rim and the end portion of the shell engaged therein.

9. A sun shield according to claim 7, wherein each bell-shaped member has an internal collector portion which, when the plate is connected on the external shell, forms an extension of the collector of such shell, said collector portion being funnel-shaped and terminating at a pivot pin.

10. A sun shield according to claim 9, wherein the collector portions of each head are connected, through respective pipe unions and hoses associated therewith to respective recycle and delivery pipes for said fluid.

11. A sun shield according to claim 1, wherein the pallet has a pair of aligned pivot pins and metallic bushes therefore which are located in corresponding lower and upper supports which are formed as box structures housing a recycle pipe and a delivery pipe for said fluid.

12. A sun shield, according to claim 11, wherein means controlled by a timed servocontrol are provided for angularly pivoting the pallet about the axes of said pins to effect the required orientation of the pallet at any particular time.

13. A sun shield, according to claim 11, wherein the pins are hollow and are lined by a metallic tube which extends from one pin to the other through a corresponding seat extending longitudinally through the collector.

14. A sun shield according to claim 1, wherein means are provided to connect groups of the pallets in series for the passage of said fluid successively through the pallets in each group, and for connecting the groups in parallel to one another.

* * * * *